(12) United States Patent
Dobashi

(10) Patent No.: US 11,587,324 B2
(45) Date of Patent: Feb. 21, 2023

(54) CONTROL APPARATUS, CONTROL METHOD, STORAGE MEDIUM, AND IMAGING CONTROL SYSTEM

(71) Applicant: CANON KABUSHIKI KAISHA, Tokyo (JP)

(72) Inventor: Toshiyuki Dobashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 17/154,518

(22) Filed: Jan. 21, 2021

(65) Prior Publication Data
US 2021/0232827 A1 Jul. 29, 2021

(30) Foreign Application Priority Data
Jan. 24, 2020 (JP) .............................. JP2020-010098

(51) Int. Cl.
*G06V 10/00* (2022.01)
*G06V 20/52* (2022.01)
*G06K 9/62* (2022.01)
*G06V 10/60* (2022.01)

(52) U.S. Cl.
CPC ........... *G06V 20/52* (2022.01); *G06K 9/6261* (2013.01); *G06V 10/60* (2022.01)

(58) Field of Classification Search
CPC ..... G06T 7/10; G06T 7/11; G06T 7/12; G06T 7/13; G06T 7/90; G06T 7/162; G06T 7/174; G06V 10/26; G06V 10/56; G06V 10/60; G06V 30/148; G06V 30/18105; G06V 20/52; G06K 9/6261
See application file for complete search history.

(56) References Cited

U.S. PATENT DOCUMENTS

| | | | |
|---|---|---|---|
| 5,280,359 A | 1/1994 | Mimura | |
| 6,765,608 B1 * | 7/2004 | Himeda | ............. H04N 5/23218 348/E5.042 |
| 7,447,418 B2 * | 11/2008 | Nishio | ............... H04N 1/00323 348/E5.042 |
| 7,646,549 B2 * | 1/2010 | Zalevsky | ............... G02B 27/58 359/740 |

(Continued)

FOREIGN PATENT DOCUMENTS

WO 2013094212 A1 6/2013

*Primary Examiner* — Amir Alavi
(74) *Attorney, Agent, or Firm* — Canon U.S.A., Inc. IP Division

(57) ABSTRACT

A control apparatus includes a detection unit configured to detect an object area in an image captured by an image capturing apparatus, a dividing unit configured to divide the image into a plurality of divided areas, a first calculation unit configured to calculate a luminance difference as a difference between a luminance value of the object area and a luminance value of each of the divided areas, a second calculation unit configured to calculate a first amount of change as a difference between luminance values of the object area before and after the image capturing apparatus executes exposure control and a second amount of change as a difference between luminance values of the divided area before and after the image capturing apparatus executes exposure control, and a determination unit configured to determine a photometric area.

15 Claims, 15 Drawing Sheets

(56) References Cited

U.S. PATENT DOCUMENTS

| | | | | |
|---|---|---|---|---|
| 7,852,217 | B2* | 12/2010 | Kondo | G01S 13/78 340/572.1 |
| 7,961,222 | B2* | 6/2011 | Motomura | H04N 5/23254 348/208.6 |
| 7,961,953 | B2* | 6/2011 | Itoh | G08B 13/1961 382/209 |
| 8,077,246 | B2* | 12/2011 | Mori | G06T 3/40 348/340 |
| 8,319,883 | B2* | 11/2012 | Hada | H04N 5/232945 348/346 |
| 8,331,619 | B2* | 12/2012 | Ikenoue | G06T 7/12 348/169 |
| 9,143,682 | B2* | 9/2015 | Ishige | H04N 5/145 |
| 10,169,880 | B2* | 1/2019 | Homma | G06F 3/017 |
| 2002/0154791 | A1* | 10/2002 | Onuma | G08B 13/19606 382/199 |
| 2014/0362281 | A1 | 12/2014 | Yamada | |
| 2020/0012171 | A1 | 1/2020 | Yoshino | |

* cited by examiner

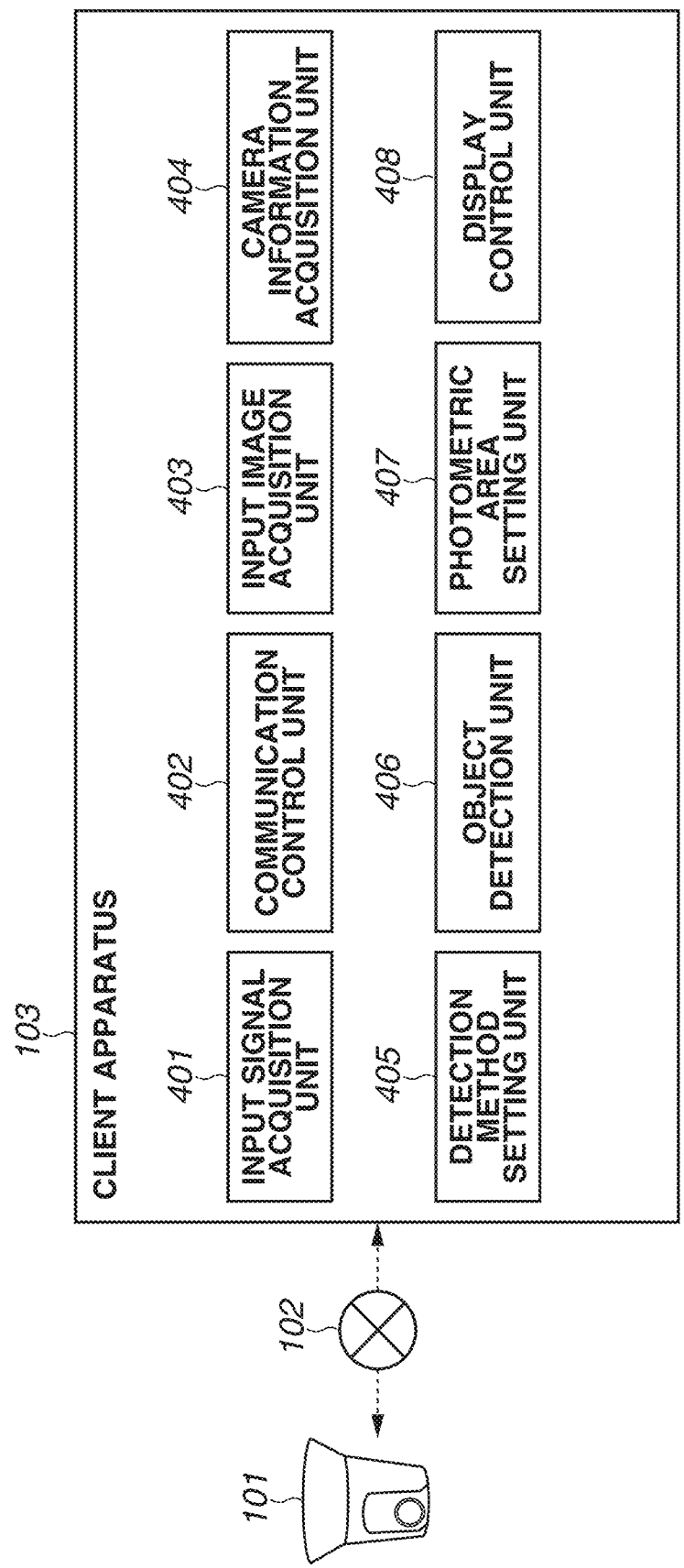

CUSTOM PHOTOMETRIC MODE

CENTER-WEIGHTED PHOTOMETRIC MODE

EXAMPLE OF AREA DIVISION (BEFORE AE)

EXAMPLE OF AREA DIVISION (AFTER AE)

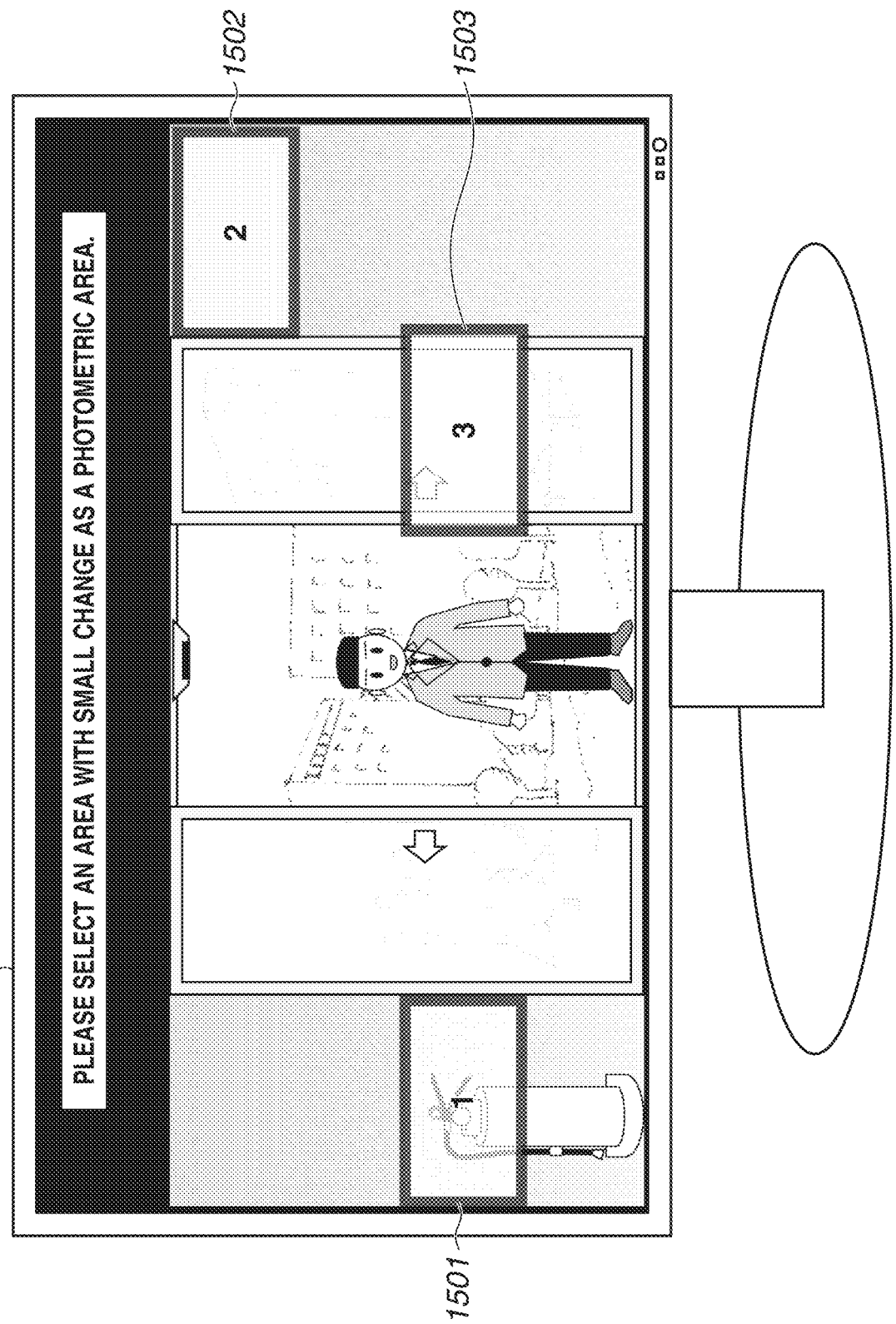

CONTROL APPARATUS, CONTROL METHOD, STORAGE MEDIUM, AND IMAGING CONTROL SYSTEM

BACKGROUND

Field of the Disclosure

The present invention relates to a control apparatus, a control method, a storage medium, and an imaging control system.

Description of the Related Art

Conventionally, a technique for setting an area from among divided areas of an image, where a difference between a luminance value of the area and a luminance value of a detected face area is smaller than a predetermined value, as a photometric area has been known (International Patent Publication No. WO 2013/094212).

SUMMARY

According to an aspect of the present invention, a control apparatus includes a detection unit configured to detect an object area in an image captured by an image capturing apparatus, a dividing unit configured to divide the image into a plurality of divided areas, a first calculation unit configured to calculate a luminance difference as a difference between a luminance value of the object area and a luminance value of each of the divided areas, a second calculation unit configured to calculate a first amount of change as a difference between luminance values of the object area before and after the image capturing apparatus executes exposure control by setting the object area as a photometric area and a second amount of change as a difference between luminance values of the divided area before and after the image capturing apparatus executes exposure control by setting the object area as a photometric area, and a determination unit configured to determine a photometric area which is used when the image capturing apparatus executes exposure control based on the first amount of change, the second amount of change, and the luminance difference.

Further features of the present disclosure will become apparent from the following description of exemplary embodiments with reference to the attached drawings.

BRIEF DESCRIPTION OF THE DRAWINGS

FIG. 4 is a block diagram illustrating a function executed by the client apparatus in FIG. 3 and a configuration thereof.

FIG. 15 is a diagram illustrating an area candidate superimposed and displayed on an input image on a display device.

DESCRIPTION OF THE EMBODIMENTS

Hereinafter, exemplary embodiments of the present invention will be described in detail with reference to the appended drawings. The embodiments described hereinafter are not intended to limit the present invention, and not all of the combinations of features described in the exemplary embodiments are required as solutions of the present invention. Configurations described in the exemplary embodiments can be modified or changed as appropriate depending on specifications of an apparatus to which the present invention is applied or various conditions such as a use condition and a use environment. A technical range of the present invention is confirmed by a scope of the appended claims, and not limited to each of the exemplary embodiments described below. Further, a part of the exemplary embodiments described below may be combined as appropriate.

In addition, one or more functional blocks illustrated in the below-described drawings may be realized by hardware such as an application specific integrated circuit (ASIC) or a programmable logic array (PLA), or may be realized by a programmable processor such as a central processing unit (CPU) or a micro-processing unit (MPU) by executing software. Furthermore, the functional block may be realized by a combination of software and hardware. Accordingly, in the below-described exemplary embodiments, different functional blocks described as operating entities can be realized by the same hardware.

A first exemplary embodiment will be described with reference to FIGS. 1 to 8.
<Basic Configuration>

Figure 1:
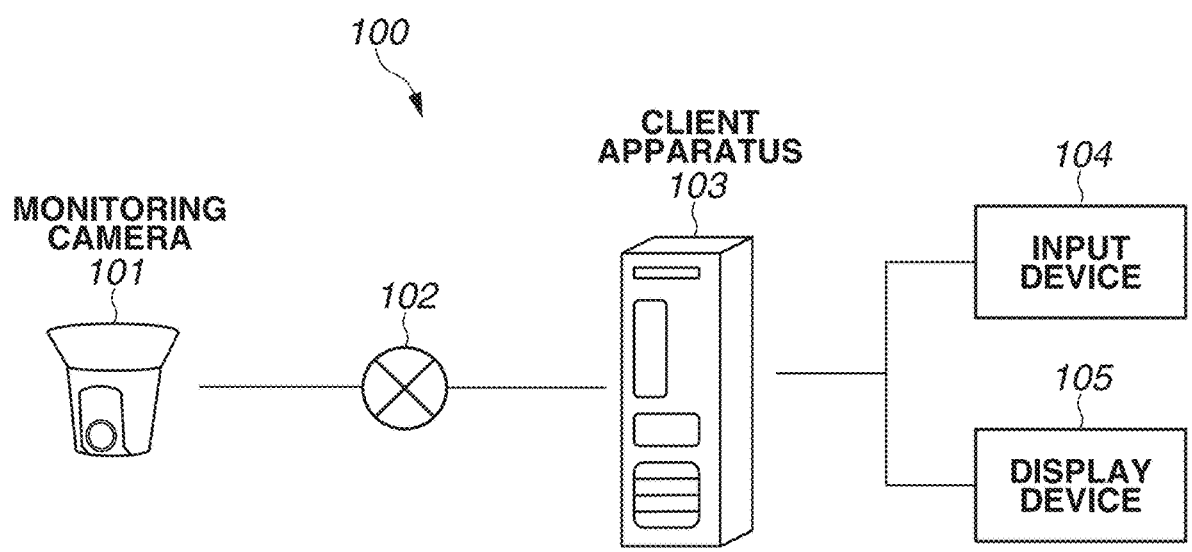
FIG. 1 is a block diagram illustrating a configuration of an imaging control system according to a first exemplary embodiment of the present invention.

FIG. 1 is a diagram illustrating a configuration of an imaging control system 100 according to the present exemplary embodiment of the present invention.

The imaging control system 100 includes a monitoring camera 101, a network 102, a client apparatus 103, an input device 104, and a display device 105. The monitoring camera 101 is an image capturing apparatus for acquiring a moving image, and image capturing of an object and image processing can be executed thereby. The monitoring camera 101 and the client apparatus 103 are connected to each other in a mutually communicable state via the network 102. The client apparatus 103 is connected to the input device 104 and the display device 105 in a communicable state. The client apparatus 103 may be called an information processing apparatus because various types of information is processed thereby. Further, the client apparatus 103 may be called a control apparatus because image capturing executed by the monitoring camera 101 is controlled thereby.

The input device 104 is configured of a mouse and a keyboard, and is operated by a user of the client apparatus 103.

The display device 105 is a device that includes a monitor for displaying an image received from the client apparatus 103. In addition, the display device 105 can also function as a user interface (UI) such as a touch panel. In this case, the display device 105 can function as an input device that inputs an instruction, information, and data to the client apparatus 103.

In FIG. 1, each of the client apparatus 103, the input device 104, and the display device 105 is illustrated as an independent device. However, the present exemplary embodiment is not limited to the above-described configuration. For example, the client apparatus 103 and the display device 105, or the input device 104 and the display device 105 may be integrated. Furthermore, the client apparatus 103, the input device 104, and the display device 105 may be integrated. When the client apparatus 103 and the display device 105 are integrated, for example, this integrated apparatus has a form of a personal computer, a tablet terminal, or a smartphone.

<Configuration of Monitoring Camera>

Figure 2:
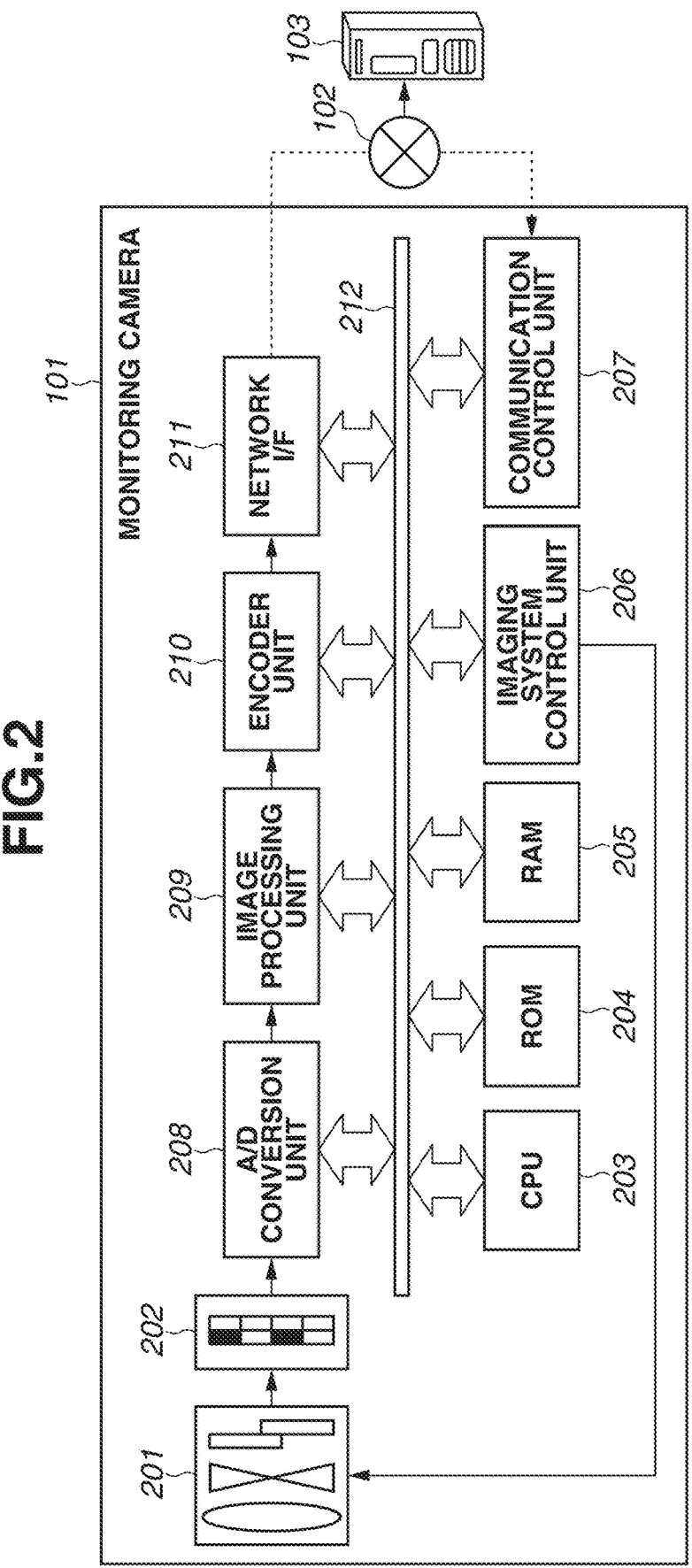
FIG. 2 is a block diagram illustrating an internal configuration of a monitoring camera according to the first exemplary embodiment.

FIG. 2 is a block diagram illustrating an internal configuration of the monitoring camera 101. The monitoring camera 101 includes an imaging optical system 201, an image sensor 202, a camera central processing unit (CPU) 203, a read only memory (ROM) 204, a random access memory (RAM) 205, an imaging system control unit 206, a communication control unit 207, an analog/digital (A/D) conversion unit 208, an image processing unit 209, an encoder unit 210, and a network interface (I/F) 211. The respective units 203 to 211 included in the monitoring camera 101 are connected to each other via a system bus 212.

The imaging optical system 201 is a group of optical members which collects light information of an object, configured of a zoom lens, a focus lens, a camera-shake correction lens, an aperture, and a shutter. The imaging optical system 201 is connected to the image sensor 202.

The image sensor 202 is an electric-charge accumulation type solid-state image sensor such as a complementary metal oxide semiconductor (CMOS) sensor or a charge-coupled device (CCD) sensor, which converts a light flux collected by the imaging optical system 201 into an electric current value (signal value). The image sensor 202 is combined with a color filter to serve as an imaging unit for acquiring color information.

The camera CPU 203 is a control unit which collectively controls operations of the monitoring camera 101. The camera CPU 203 reads an instruction stored in the ROM 204 or the RAM 205 to execute processing according to the read result.

The imaging system control unit 206 controls the units of the monitoring camera 101 based on the instruction from the camera CPU 203. For example, the imaging system control unit 206 executes various types of control such as focus control, shutter control, and aperture adjustment with respect to the imaging optical system 201.

The communication control unit 207 communicates with the client apparatus 103 and executes control processing for transmitting control commands (control signals) for the units of the monitoring camera 101, received from the client apparatus 103, to the camera CPU 203.

The A/D conversion unit 208 converts a light amount of an object detected by the image sensor 202 to a digital signal (image data). The A/D conversion unit 208 transmits the digital signal to the image processing unit 209.

The image processing unit 209 executes image processing on image data of a digital signal received from the image sensor 202. The image processing unit 209 is connected to the encoder unit 210.

The encoder unit 210 executes processing for converting the image data processed by the image processing unit 209 to data in a file format such as "Motion Jpeg", "H264", or "H265". The encoder unit 210 is connected to the network I/F 211.

The network I/F 211 is an interface used for communicating with an external apparatus such as the client apparatus 103 via the network 102. The network I/F 211 is controlled by the communication control unit 207.

The network 102 is an internet protocol (IP) network that connects the monitoring camera 101 and the client apparatus 103. For example, the network 102 is configured of a plurality of routers, switches, and cables which are compliant with the communication standard of the Ethernet (registered trademark). In the present exemplary embodiment, any network which enables the monitoring camera 101 and the client apparatus 103 to communicate with each other can be used as the network 102, and a communication standard, a scale, and a configuration thereof are not taken into consideration. For example, the network 102 may be configured of the internet, a wired local area network (LAN), a wireless LAN, or a wide area network (WAN).

<Configuration of Client Apparatus>

Figure 3:
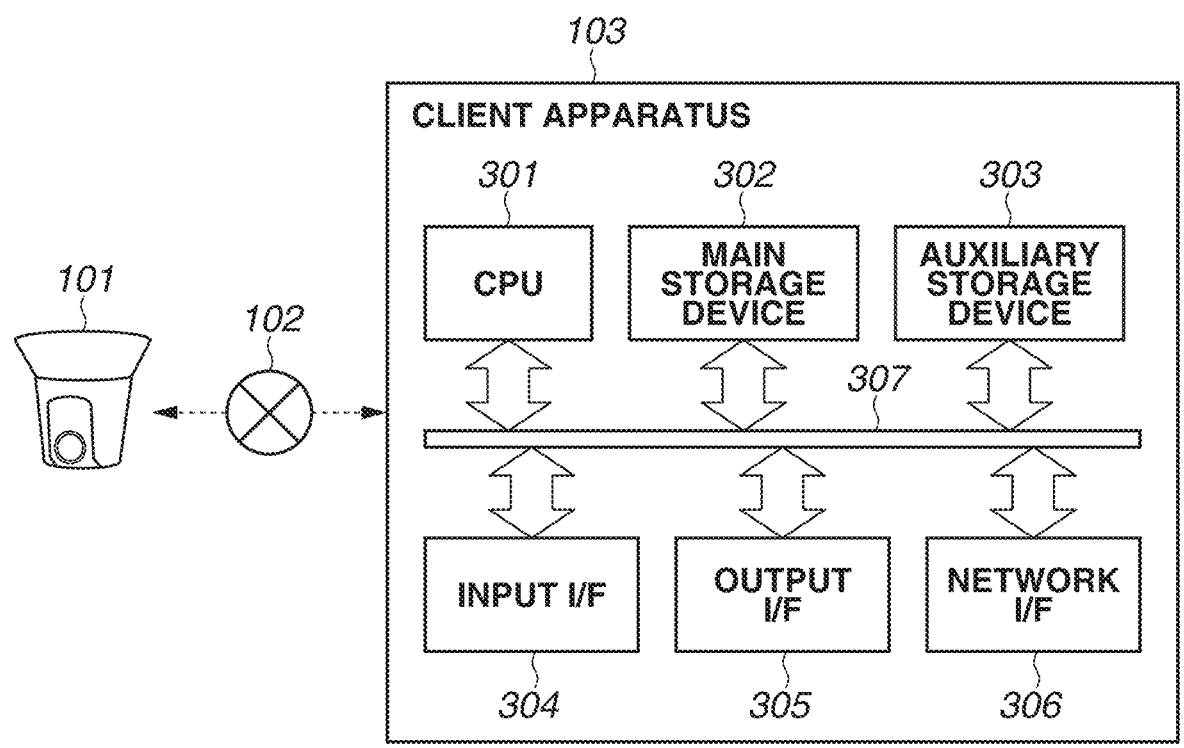
FIG. 3 is a block diagram illustrating an internal configuration of a client apparatus according to the first exemplary embodiment.

FIG. 3 is a block diagram illustrating an internal configuration of the client apparatus 103.

The client apparatus 103 includes a client CPU 301, a main storage device 302, an auxiliary storage device 303, an input I/F 304, an output I/F 305, and a network I/F 306. The respective elements of the client apparatus 103 are communicably connected to each other via a system bus 307.

The client CPU 301 is a central processing device which collectively controls operations of the client apparatus 103. In addition, the client CPU 301 may collectively control the monitoring camera 101 via the network 102.

The main storage device 302 is a storage device such as a RAM, which functions as a temporary data storage area of the client CPU 301. For example, the main storage device 302 previously stores patterns of pattern matching (i.e., patterns corresponding to feature portions of a face and a human body) which are used when the client apparatus 103 executes face detection or human body detection.

The auxiliary storage device 303 is a storage device such as a hard disk drive (HDD), a ROM, or a solid state device (SSD), which stores various programs and various types of setting data.

The input I/F 304 is used when the client apparatus 103 receives an input (signal) from the input device 104.

The output I/F 305 is used when the client apparatus 103 outputs information (signal) to the display device 105.

The network I/F 306 is used when the client apparatus 103 communicates with an external apparatus such as the monitoring camera 101 via the network 102.

The client CPU 301 is a programmable processor or device that executes processing based on a program stored in the auxiliary storage device 303 to realize the functions and processing of the client apparatus 103 illustrated in FIG. 4. The functions and processing of the client apparatus 103 will be described below in detail.

<Functions of Client Apparatus>

FIG. 4 is a block diagram illustrating a function executed by the client apparatus 103. In other words, each unit (functional block) illustrated in FIG. 4 is a function that can be executed by the client CPU 301, and thus each unit is synonymous with the client CPU 301.

As illustrated in FIG. 4, the client CPU 301 of the client apparatus 103 includes an input signal acquisition unit 401, a communication control unit 402, an input image acquisition unit 403, a camera information acquisition unit 404, and a detection method setting unit 405. The client CPU 301 further includes an object detection unit 406, a photometric area setting unit 407, and a display control unit 408. In addition, the client apparatus 103 may execute functions of the respective units 401 to 408 in FIG. 4 through hardware (or software) different from the client CPU 301.

The input signal acquisition unit 401 receives an input from a user via the input device 104.

The communication control unit 402 executes control processing for receiving an image transmitted from the monitoring camera 101 (i.e., an image captured by the monitoring camera 101) via the network 102. The communication control unit 402 further executes control processing for transmitting a control command to the monitoring camera 101 from the client apparatus 103 via the network 102.

The input image acquisition unit 403 acquires an image received from the monitoring camera 101 via the communication control unit 402 as an image regarded as a target of object detection processing (i.e., an image to which the object detection processing is to be applied). The detection processing will be described below in detail.

The camera information acquisition unit 404 acquires camera information (imaging information) for capturing an object image by the monitoring camera 101 via the communication control unit 402. The camera information (imaging information) is various types of information used when an image is acquired by capturing an object. For example, the camera information is an exposure parameter such as an aperture value.

With respect to the image acquired by the input image acquisition unit 403, the detection method setting unit 405 sets a predetermined (appropriate) detection method from among various detection methods for executing face area detection (face detection) and human body area detection (human body detection). When face detection is to be executed, the below-described object detection unit 406 preferentially detects a face area in the image. When human body detection is to be executed, the object detection unit 406 preferentially detects a human body area in the image.

In the present exemplary embodiment, the detection method setting unit 405 sets (selects) either a detection method for detecting a face or a detection method for detecting a human body. However, the present exemplary embodiment is not limited to the above-described setting. For example, the detection method setting unit 405 may set (select) a detection method for detecting a feature area of a portion of a person such as an upper half of the human body or a partial area of a face such as eyes, a nose, or a mouth. Further, in the present exemplary embodiment, although an object regarded as a detection target is a person, a feature area relating to a predetermine object other than the person may be detected. For example, a predetermined object such as an animal face or an automobile, which is previously set by the client apparatus 103, may be detected.

The object detection unit 406 executes detection of a predetermined object area based on the detection method set by the detection method setting unit 405.

Figure 5A:
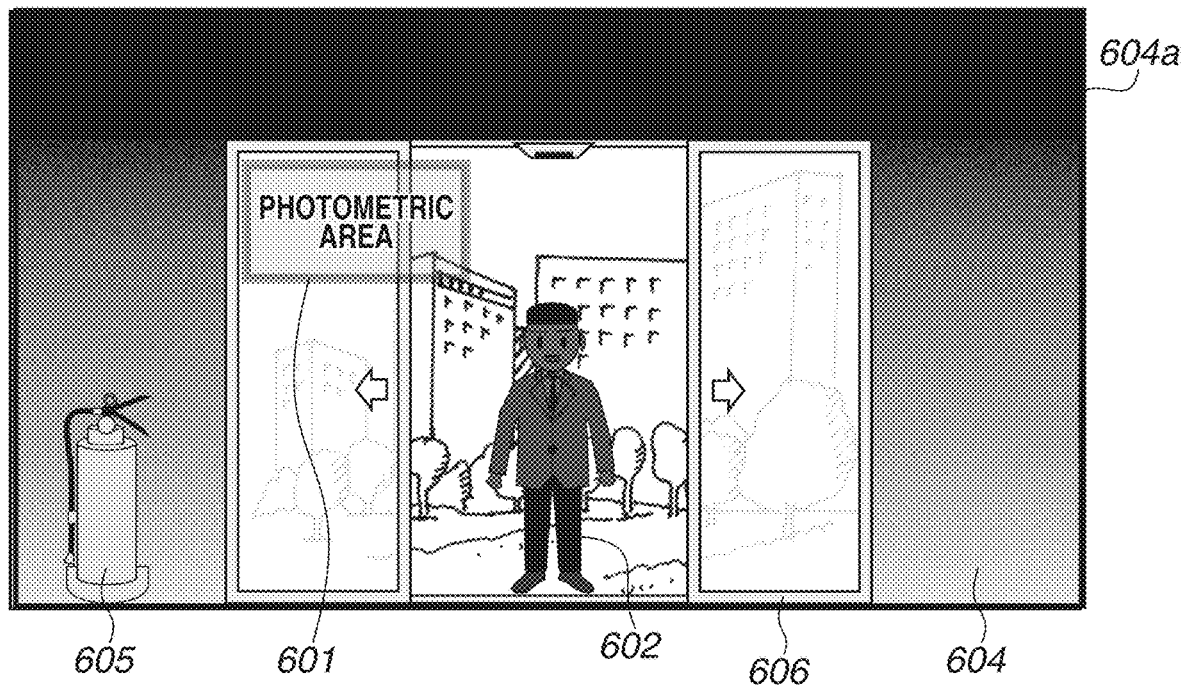
FIGS. 5A and 5B are diagrams illustrating a relationship between a photometric mode and a photometric area.
Figure 5B:
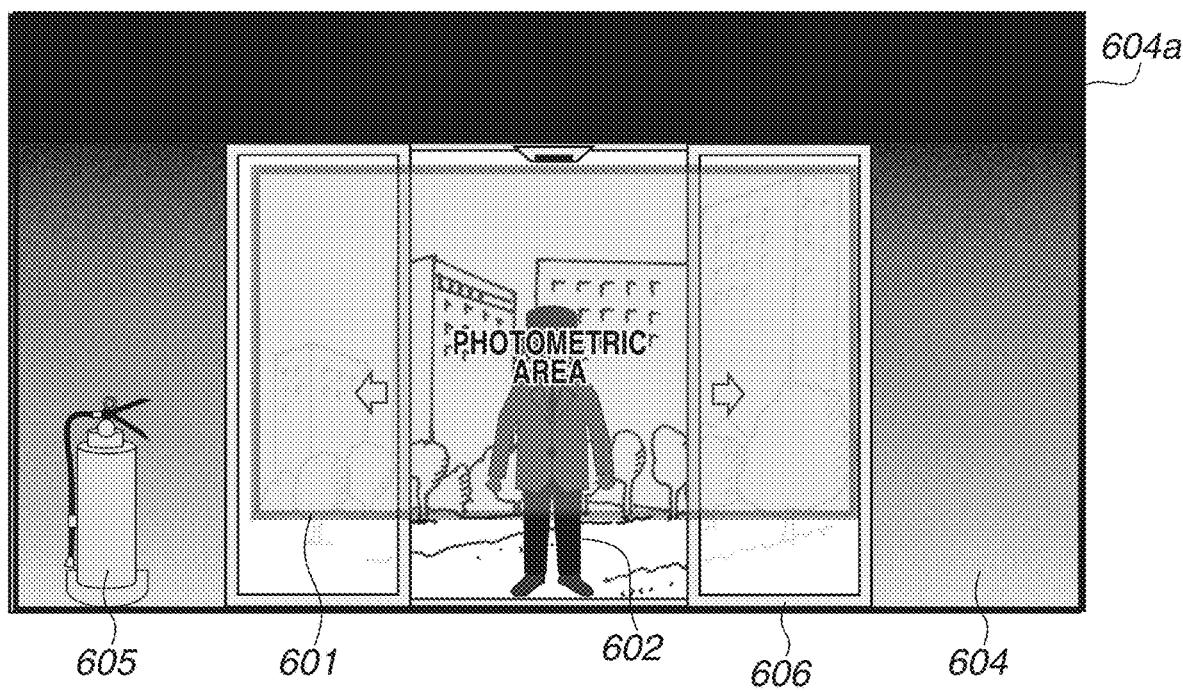

When the monitoring camera 101 is in a custom photometric mode, the photometric area setting unit 407 sets an area used for automatic exposure (AE) control to the monitoring camera 101. FIGS. 5A and 5B are diagrams illustrating a relationship between a photometric mode and a photometric area according to the present exemplary embodiment.

The monitoring camera 101 of the present exemplary embodiment includes a custom photometric mode and a center-weighted photometric mode.

The custom photometric mode is a photometric mode which enables the user to specify (set) a photometric area at an optional position in the image (screen). For example, in the custom photometric mode, as illustrated in FIG. 5A, the user can set a photometric area 601 at an upper left position of the image. In the custom photometric mode, a user's intended image-capturing (monitoring) target is likely to be included in the photometric area (specified area) set by the user. In addition, an image in FIG. 5A illustrates a state where a person 602 is entering the inside 604 of a building from the outside 603. A fire extinguisher 605 is placed in the inside 604 thereof. Opening of an automatic door 606 made of transparent glass is expressed by two white arrows in FIG. 5A. For example, an upper portion 604a of the inside 604 of the building is a black wall. The monitoring camera 101 is installed in the inside 604 with its lens being pointed at the outside 603 thereof. In the present exemplary embodiment, the person 602 is also called "object". In the image, an area that includes the person 602 can be described as an object area.

As illustrated in FIG. 5B, the center-weighted photometric mode is a photometric mode for setting the photometric area 601 near the center of the image. In the center-weighted photometric mode, a user's intended image-capturing (monitoring) target is likely to exist in the substantially central portion of the image.

The monitoring camera 101 executes exposure control based on a photometric result of the set area. Specifically, with respect to a luminance value acquired as the photometric result, the monitoring camera 101 calculates an appropriate combination of exposure parameters such as an Av value (aperture value), a Tv value (shutter speed), and an Sv value (imaging sensitivity or ISO sensitivity). In both of FIGS. 5A and 5B, the photometric area 601 is set to the outside area. Therefore, when exposure control is executed, an image is captured in a back-lighting state, so that the person 602 and the inside 604 of the building captured in that image are darkened.

According to the instruction from the client CPU 301, the display control unit 409 outputs the image acquired from the monitoring camera 101 to the display device 105.

<Object Detection Processing and Object Exposure Determination Processing>

Hereinafter, photometric area selection processing (photometric area setting processing) according to the present exemplary embodiment will be described with reference to the flowchart in FIG. 6. It is assumed that, in the imaging control system 100 in FIG. 1, the monitoring camera 101, the client apparatus 103, the input device 104, and the display device 105 are turned on, and connection (communication) between the monitoring camera 101 and the client apparatus 103 is established. In the above-described state, it is also assumed that image capturing of the object through the monitoring camera 101 at a predetermined updating cycle, transmission of image data from the monitoring camera 101 to the client apparatus 103, and display of an image through the display device 105 are repeatedly executed. Further, as an initial setting, the center-weighted photometric mode is set to the monitoring camera 101. Then, the client CPU 301 starts executing the processing illustrated in the flowchart in FIG. 6 when a captured image of the object is input to the client apparatus 103 from the monitoring camera 101 via the network 102.

First, in step S501, the client apparatus 103 communicates with the monitoring camera 101 via the communication control unit 402 to set (change) a photometric mode of the monitoring camera 101 to the custom photometric mode from the center-weighted photometric mode (i.e., initial setting mode).

Next, in step S502, the client apparatus 103 detects the object from image data. In the present exemplary embodiment, the client apparatus 103 executes detection of a face or a human body. Patterns corresponding to respective feature portions of a face and a human body are previously stored in the main storage device 302 of the client apparatus 103, and the object detection unit 406 detects a face area and a human body area through pattern matching based on these patterns. Generally, when a face area is to be detected, a face can be detected with high accuracy, so that a face area of the object and an area other than the face area can be clearly identified. However, the face area cannot be accurately detected in a case where an orientation, a size, or brightness of the face is not in a condition appropriate for face detection. On the contrary, when a human body is to be detected, an area where a person exists can be detected regardless of an orientation, a size, or brightness of the face.

In a case where a pattern matching method is used as a detection method of the object, a pattern (identifier) created through statistical learning may be used as a pattern used for the pattern matching. Alternatively, the object may be detected through a method other than the pattern matching method. For example, the object may be detected by using a luminance gradient within a local area. In other words, a detection method of the object is not limited to a specific detection method, and various methods such as a detection method based on machine learning and a detection method based on distance information can be used.

In step S503, the object detection unit 406 determines whether the face or the human body is detected. If the face or the human body is detected (YES in step S503), the processing proceeds to step S504. If the face or the human body is not detected (NO in step S503), the processing ends.

In step S504, the photometric area setting unit 407 calculates an average luminance value of the face or the human body based on the detection result acquired from the object detection unit 406. Specifically, based on the detection result acquired from the object detection unit 406, the photometric area setting unit 407 applies the information about the number of detected faces or human bodies (number of detections), a detected position, and a detected size to the following formula 1. A calculated value is saved as an average luminance value before AE.

$$\bar{I}_{object} = \frac{1}{f}\sum_{s=1}^{f}\left\{\frac{1}{k_s \times l_s}\sum_{i=-k_s/2}^{k_s/2}\sum_{j=-l_s/2}^{l_s/2} I(v_s + i, h_s + j)\right\} \quad \text{Formula 1}$$

Here, "I(x, y)" represents a luminance value of a two-dimensional coordinate position (x, y) in a horizontal direction (i.e., x-axis direction) and a vertical direction (i.e., y-axis direction) in the image. Further, "f" represents the number of detected faces or detected human bodies, "(v, h)" represents central coordinates where the face or the human body is detected, "k" represents a detected object size in the horizontal direction, and "l" represents a detected object size in the vertical direction. In addition, of the detected human body portions, a human body portion corresponding to the detected face can be eliminated from the calculation in the formula 1.

Figure 7A:
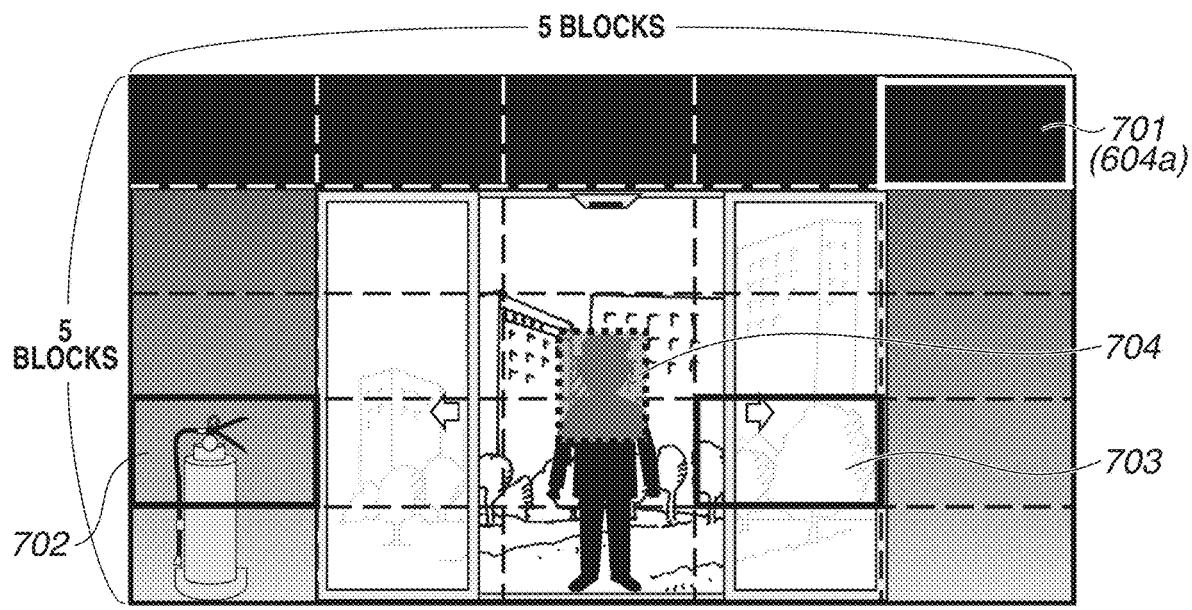
FIGS. 7A and 7B are diagrams illustrating area division of an image according to the first exemplary embodiment.
Figure 7B:
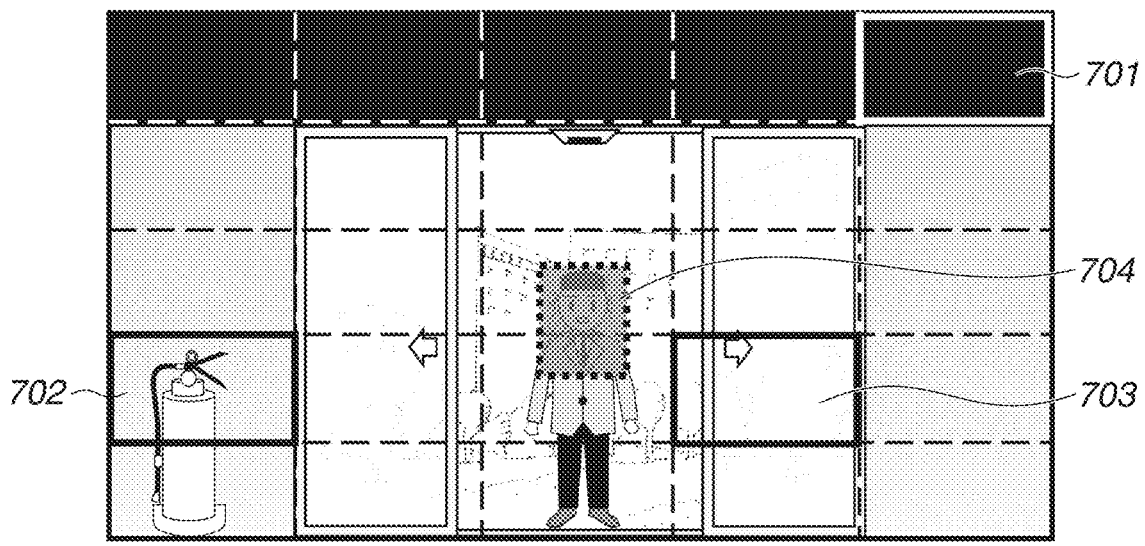

Next, in step S505, the photometric area setting unit 407 executes area division of the input image. In the present exemplary embodiment, as illustrated in FIG. 7A, the image is divided into areas of 5 blocks×5 blocks. These 25 blocks (areas) have identical rectangular shapes. The 25 blocks can also be called divided areas. In the present exemplary embodiment, reference numerals 701, 702, and 703 are applied to 3 areas from among the 25 areas. An area 701 in FIG. 7A is one portion of the upper portion 604a of the inside of the building in FIGS. 5A and 5B, which is an area such as a black wall where luminance is low regardless of whether the area is in a back-lighting state or a front-lighting state. An area 702 is an area on the left side of the room. The area 702 is slightly brighter than the area 701 because of outside light incident thereon. An area 703 is one portion of the outside area, which is brighter than the area 702. In addition, an area 704 is not a divided area but a face/human body area (i.e., an area including a human face and body) described below. The area 704 can be called an object area because it is an area of the human 602. The area 704 includes at least a human face or a human body.

Next, in step S506, the photometric area setting unit 407 calculates an average luminance value of each of the areas r divided in step S505 through the formula 2 and saves the calculation result as an average luminance value before AE.

$$\bar{I}_{area_r} = \frac{1}{m_r \times n_r}\sum_{i=-m_r/2}^{m_r/2}\sum_{j=-n_r/2}^{n_r/2} I(p_r + i, q_r + j) \quad \text{Formula 2}$$

Here, "I(x, y)" represents a luminance value of a two-dimensional coordinate position (x, y) in a horizontal direction (i.e., x-axis direction) and a vertical direction (i.e., y-axis direction) in the image. Further, "(p, q)" represents central coordinates of each area, "m" represents a size of each area in the horizontal direction, and "n" represents a size of each area in the vertical direction.

Next, in step S507, the photometric area setting unit 407 sets the face/human body area detected in step S502 to the monitoring camera 101 as a photometric area. The face/human body area 704 in FIG. 7A is the area set in step S507.

In step S508, the photometric area setting unit 407 instructs the monitoring camera 101 to execute AE.

In step S509, the photometric area setting unit 407 waits until the monitoring camera 101 has completed AE. For example, the photometric area setting unit 407 determines whether the monitoring camera 101 has completed AE, depending on whether the client apparatus 103 has received an AE completion notification from the monitoring camera 101. Alternatively, the photometric area setting unit 407 determines whether the monitoring camera 101 has completed AE, depending on whether luminance change of the input image input to the client apparatus 103 from the monitoring camera 101 has become stable.

In step S510, similar to the processing in step S504, the photometric area setting unit 407 calculates an average luminance value of the face or the human body. A calculated value is saved as an average luminance value after AE.

In step S511, similar to the processing in step S506, the photometric area setting unit 407 calculates an average luminance value of each of divided areas. A calculated value is saved as an average luminance value after AE.

Figure 8:
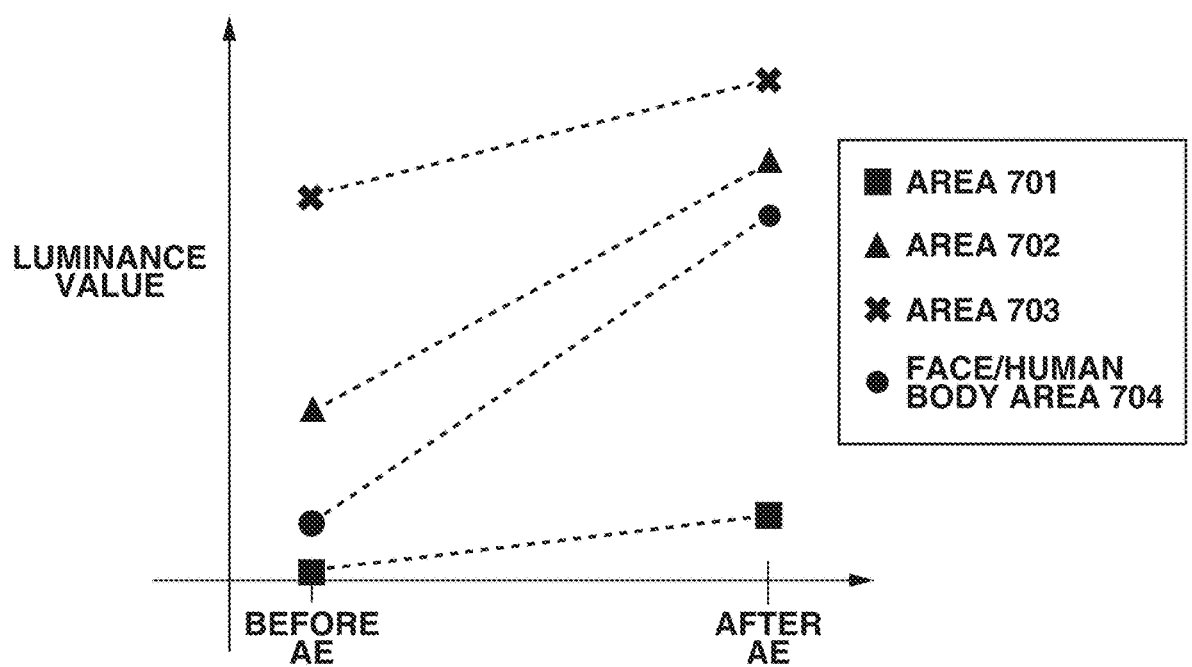
FIG. 8 is a diagram illustrating a relationship between luminance values before and after auto-exposure control according to the first exemplary embodiment.

In step S512, with respect to each of the face/human body area 704 and the divided areas, the photometric area setting unit 407 subtracts the average luminance value before AE from the average luminance value after AE to acquire a luminance change amount ΔIobject or ΔIarea. The luminance change amount ΔIobject is a difference between the average luminance values of the face/human body area 704 before and after AE, and the luminance change amount ΔIarea is a difference between the average luminance values of each divided area before and after AE. FIG. 8 is a diagram illustrating examples of the luminance values of the areas 701 to 704 before AE in FIG. 7A and the luminance values of the areas 701 to 704 after AE in FIG. 7B. When attention is given to only the luminance values before AE, it is found that the area 701 has a luminance value closest to the luminance value of the face/human body area 704. However, in a black area (object) such as the area 701, after execution of AE, a luminance value is increased not as much as the luminance value of the face/human body area 704. Further, in a case where a scene includes a considerable amount of bright area, a luminance value is saturated in the area other than the face/human body area to cause overexposure to occur. In this case, the photometric area cannot be appropriately selected if attention is given to only the luminance value after AE. In the present exemplary embodiment, the processing in steps S513 to S515 is executed in order to appropriately select the photometric area. In other words, in the present exemplary embodiment, the photometric area is set with consideration for the luminance change amount after execution of AE.

In step S513, the photometric area setting unit 407 extracts an area that satisfies the formula 3, i.e., an area where an absolute value of a difference between the luminance change amounts ΔIobject and ΔIarea calculated in step S512 is a threshold value Th or less, as an area candidate. In the present exemplary embodiment, it is assumed that the areas 702 and 703 satisfy the formula 3.

The number of area candidates to be set as the photometric area is increased when a large value is set as the threshold value (parameter) Th. However, on the contrary, there is a concern about lowering of accuracy. The threshold value Th may be appropriately set by the user depending on the installation environment of the monitoring camera 101. Alternatively, a low value may be set as an initial value thereof, so that the value is gradually increased until a predetermined number of area candidates is extracted.

$$|\Delta \bar{I}_{object} - \Delta \bar{I}_{area_r}| \leq Th \qquad \text{Formula 3}$$

Next, in step S514, the photometric area setting unit 407 calculates a difference value (luminance difference) ΔIr between the average luminance value Iobject of the face/human body after AE calculated in step S510 and the average luminance value Iarea of each area after AE calculated in step S511 through the formula 4, with respect to the area candidate extracted in step S513.

$$\Delta \bar{I}_r = |\bar{I}_{object} - \bar{I}_{area_r}| \qquad \text{Formula 4}$$

Next, in step S515, the photometric area setting unit 407 extracts an area r where the smallest value is calculated as the difference value ΔIr in step S514 through the formula 5, and sets the extracted area r to the monitoring camera 101 as the photometric area in the custom photometric mode, and the processing ends. In the present exemplary embodiment, of the two area candidates 702 and 703, the area 702 is set to the monitoring camera 101 as the photometric area in the custom photometric mode because the difference value ΔIr of the area 702 is smaller than that of the area 703.

$$r_{min} = \operatorname{argmin}(\Delta \bar{I}_r) \qquad \text{Formula 5}$$

As described above, in the imaging control system 100 according to the present exemplary embodiment, an area where the luminance is close to the luminance of the face/human body is automatically set (determined) as the photometric area for the custom photometric mode. Because the photometric area is determined as described above, exposure control can be constantly executed by AE, such that luminance is adjusted to a level appropriate for detecting the face/human body. For example, at an entrance of a store or a stadium where a door made of glass is installed, a lighting state shifts between a back-lighting state and a front-lighting state depending on the weather or time. Therefore, there is a case where brightness of the face of the object (person) such as a customer or a visitor is changed, or the face cannot be captured for a considerable period of time. Even in the above-described environment, the photometric area can be appropriately set. Therefore, the human face in the captured image will not be blackened.

Conventionally, there has been a case where exposure adjustment cannot be appropriately executed because a black object (e.g., area 701) is set as a photometric area when a persons' face is blacked by strong back-light. However, according to the present exemplary embodiment, the area 701 will not be selected.

In the present exemplary embodiment, the photometric area is set by extracting only an area where a difference value of the luminance change amount is a threshold value (predetermined value) Th or less. However, the setting method is not limited to the above. However, the setting method is not limited to the above. For example, a difference value ΔIr of the average luminance values calculated in step S514 may be weighted with the luminance change amount difference.

Further, in the present exemplary embodiment, the processing in steps S504 to S515 is executed every time the face or the human body is detected (i.e., every time the determination result in step S503 is "YES"). However, the present exemplary embodiment is not limited thereto. For example, the processing in FIG. 6 may be executed only when a motionless person is detected. In this case, for example, a processing step for detecting a moving speed of the object is added between steps S501 and S502, and the processing proceeds to step S502 only when the moving speed is a predetermined value or less. The processing can be executed with higher accuracy when the processing in FIG. 6 is executed with respect to a motionless and stable object. Further, the processing in FIG. 6 may be executed only once with a person standing in a back-lighting state as illustrated in FIGS. 5A and 5B when the monitoring camera 101 is to be installed.

Hereinafter, a second exemplary embodiment of the present invention will be described with reference to FIG. 1, FIGS. 3 to 5B, and FIGS. 9 to 12. In a method according to the present exemplary embodiment, by using distance information of an object 602 (i.e., a distance from the monitoring camera 101 to the object), an area that is close to an area where the face or the human body is detected is automatically selected as a photometric area for the custom photometric mode. The same reference numerals are applied to the configuration and the processing similar to those described in the first exemplary embodiment, and detailed description thereof will be omitted.

Figure 9:
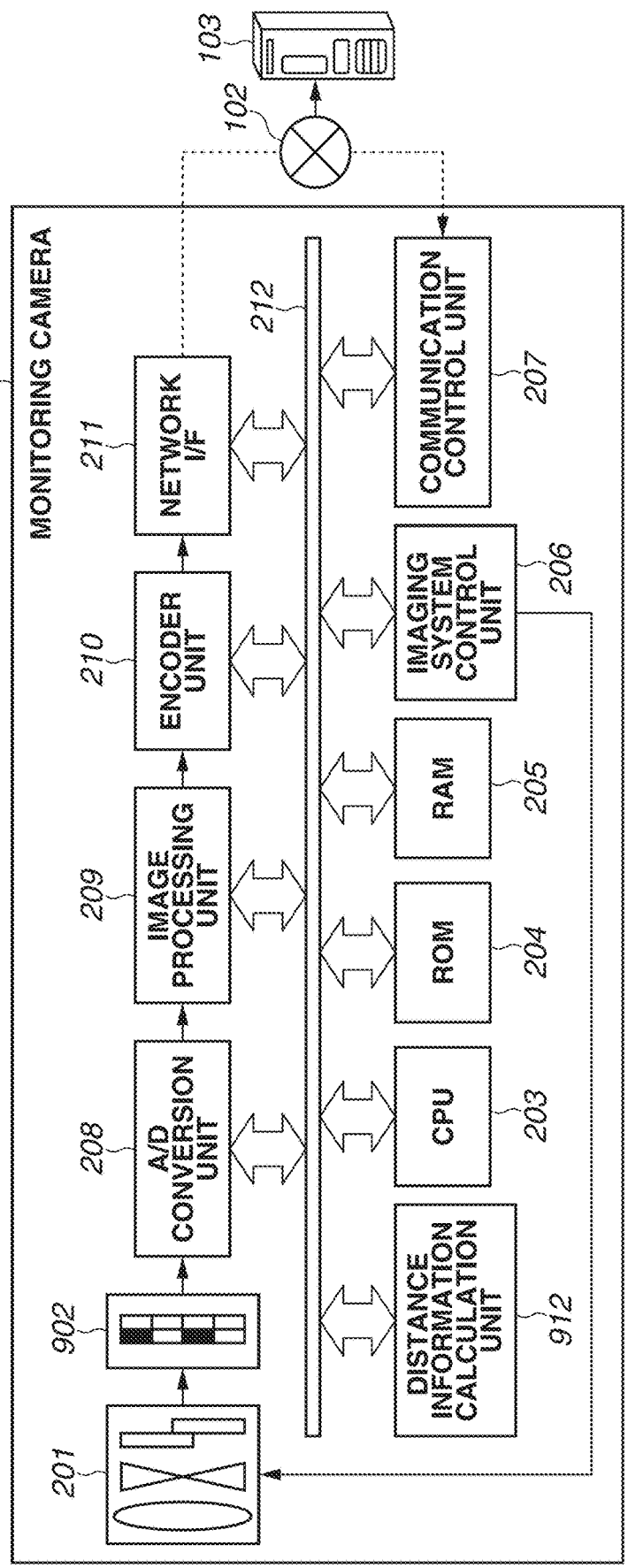
FIG. 9 is a block diagram illustrating an internal configuration of a monitoring camera according to a second exemplary embodiment.

FIG. 9 is a block diagram illustrating an internal configuration of the monitoring camera 101 according to the present exemplary embodiment. The monitoring camera 101 in FIG. 9 is different from the monitoring camera 101 in FIG. 2 of the first exemplary embodiment in that the monitoring camera 101 in FIG. 9 includes an image sensor 902 and a distance information calculation unit 912.

The image sensor 902 is an electric-charge accumulation type solid-state image sensor such as a CMOS sensor or a CCD sensor, which converts a light flux collected by the imaging optical system 201 into an electric current value (signal value). The image sensor 902 is combined with a color filter to serve as an imaging unit for acquiring color information. The image sensor 902 according to the present exemplary embodiment also functions as an image plane phase difference sensor having the below-described configuration illustrated in FIGS. 10 and 11.

Figure 10:
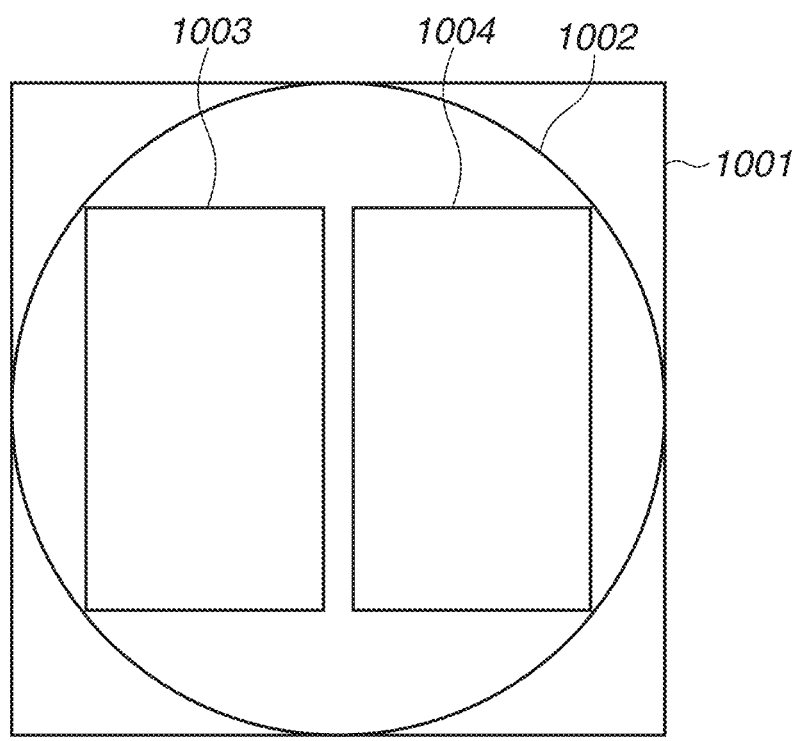
FIG. 10 is a block diagram illustrating an internal configuration of an image sensor of the monitoring camera in FIG. 9.

The distance information calculation unit 912 calculates distance information of each pixel in the image from the image signal acquired from the A/D conversion unit 208. Herein, calculation of the distance information will be described with reference to FIGS. 10 and 11. FIG. 10 is a diagram schematically illustrating a configuration of one pixel 1001 of the image sensor 902. The pixel 1001 includes a microlens 1002. Further, the pixel 1001 includes a plurality of photodiodes (hereinafter, expressed as "PD") as a plurality of photoelectric conversion areas. In FIG. 10, the one pixel 1001 includes two PDs 1003 and 1004. In addition, the number of PDs should be two or more.

Figure 11:
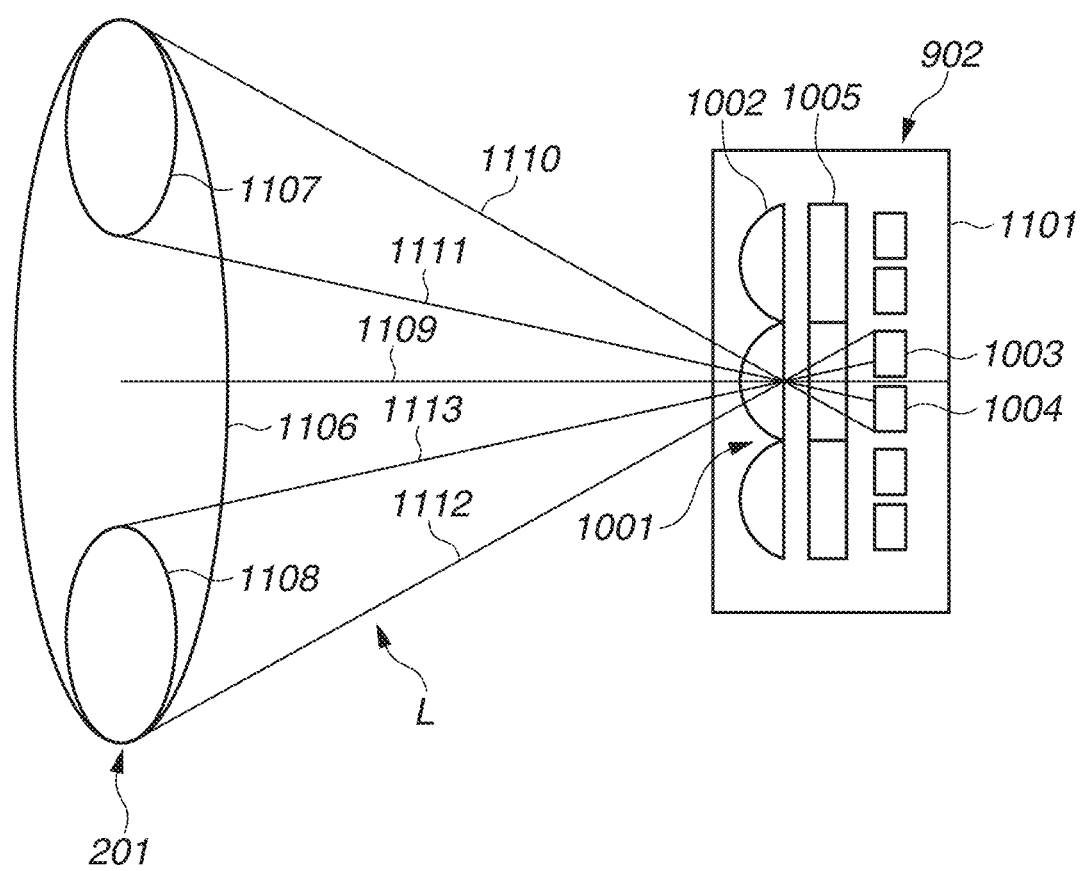
FIG. 11 is a conceptual diagram illustrating a state where a light flux is incident on the image sensor.

FIG. 11 is a conceptual diagram illustrating a state where a light flux L output from an exit pupil 1106 of the imaging optical system 201 is incident on the one pixel 1001 of the image sensor 902. In FIG. 11, a cross sectional view of a pixel array 1101 of the image sensor 902 is schematically illustrated. The pixel array 1101 includes a microlens 1002, a PD 1003, a PD 1004, and a color filter 1005.

In FIG. 11, an optical axis 1109 expresses a center of the light flux L output from the exit pupil 1106 and incident on the pixel 1001 having the microlens 1002. The light flux L output from the exit pupil 1106 is incident on the image sensor 902 by making the optical axis 1109 as a center.

Areas 1107 and 1108 are partial areas of the exit pupil 1106 of the imaging optical system 201. Light beams 1110 and 1111 are the outermost circumference light beams of light passing through the partial area 1107 of the exit pupil 1106, and light beams 1112 and 1113 are the outermost circumference light beams of light passing through the partial area 1108 of the exit pupil 1106. As illustrated in FIG. 11, of the light flux L output from the exit pupil 1106, the light flux on the upper side of the optical axis 1109 is incident on the PD 1104, whereas the light flux on the lower side thereof is incident on the PD 1003. In other words, each of the PDs 1003 and 1004 receives light output from different areas of the exit pupil 1106 of the imaging optical system 201. When a light signal received by the PD 1003 is an image A and a light signal received by the PD 1004 is an image B, a defocus amount can be calculated based on a parallax between the pair of image signals A and B. Then, distance information can be acquired from the defocus amount. The defocus amount is a phase shifting amount (i.e., phase difference amount). As described above, the image sensor 902 can function as an image plane phase difference sensor that detects the images A and B.

Hereinafter, the photometric area selection processing according to the present exemplary embodiment will be described with reference to the flowchart in FIG. 12. The processing is started at a timing similar to the timing described in the first exemplary embodiment, so that description thereof will be omitted. In the present exemplary embodiment, distance information calculated by the distance information calculation unit 912 of the monitoring camera 101 is transmitted to the client apparatus 103 together with image data at a predetermined updating cycle.

Figure 6:
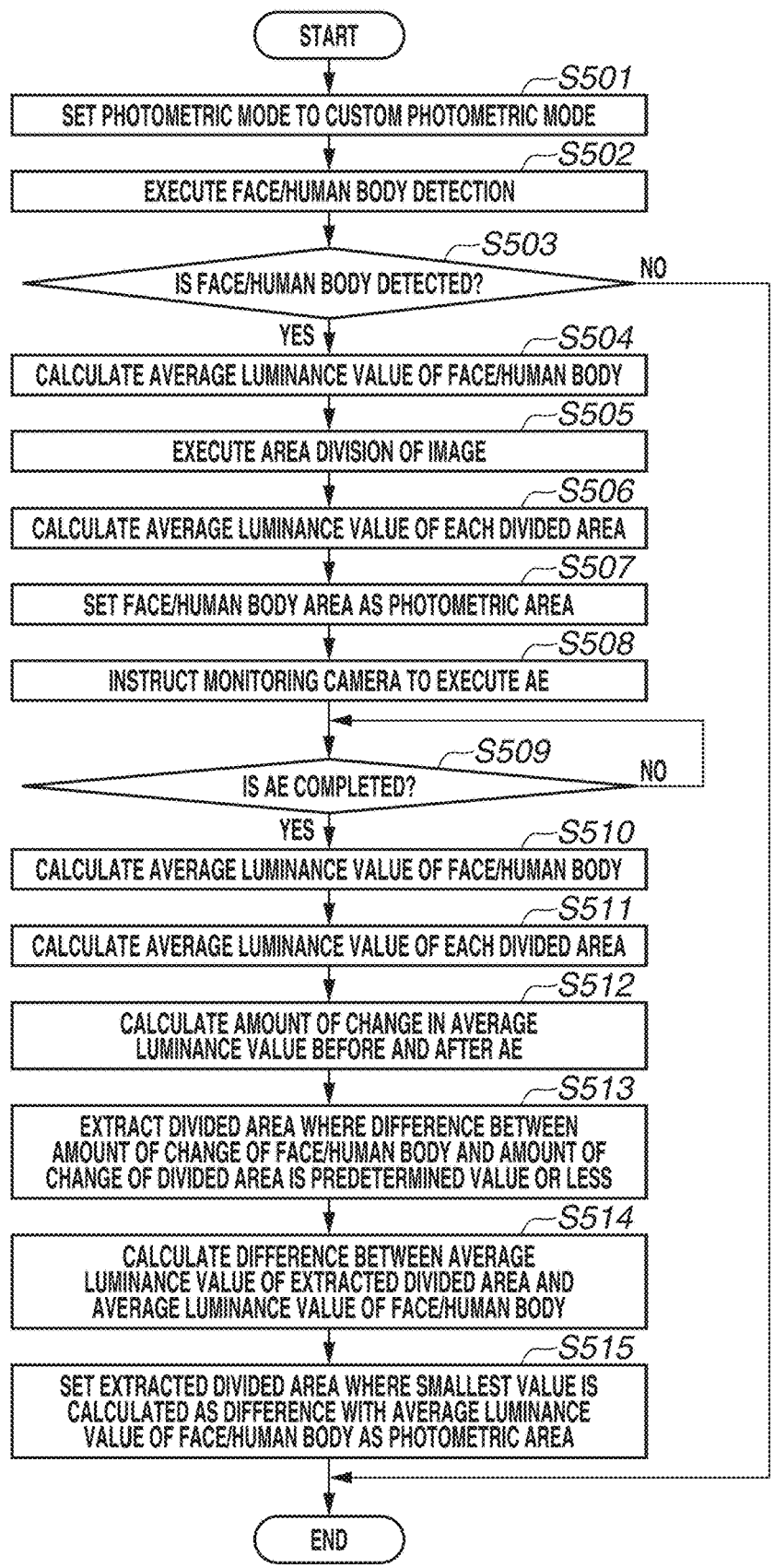
FIG. 6 is a flowchart illustrating photometric area setting processing according to the first exemplary embodiment.
Figure 12:
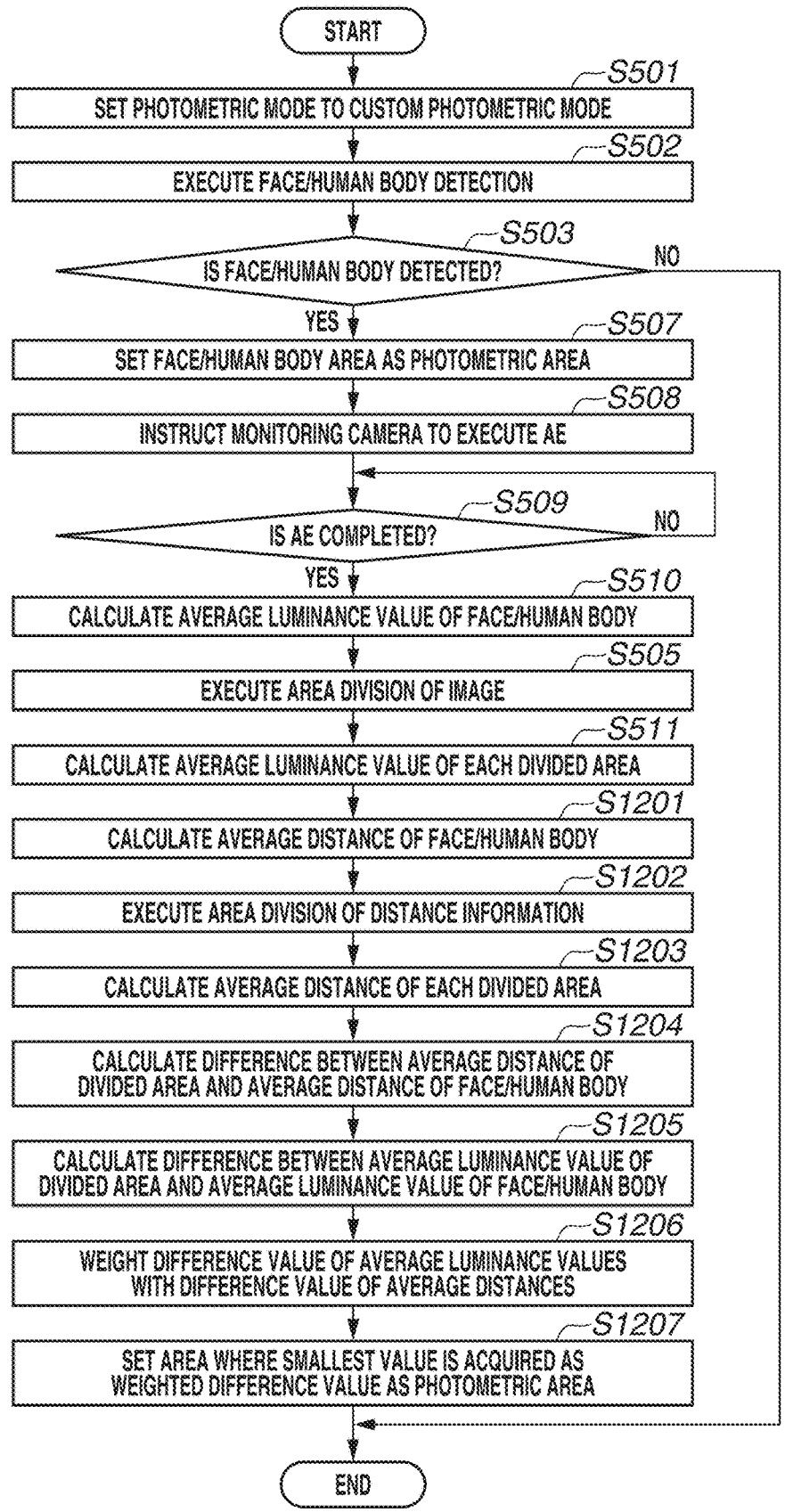
FIG. 12 is a flowchart illustrating photometric area setting processing according to the second exemplary embodiment.

When the flowchart in FIG. 12 is compared with the flowchart in FIG. 6 described in the first exemplary embodiment, it is found that, in FIG. 12, steps S507 to S510 are executed after step S503, step S505 is executed after step S510, and step S511 is executed after step S505. Further, in the present exemplary embodiment, steps S1201 to S1207 are executed after step S511. The processing in steps S501 to S503, S505, and S507 to S511 is similar to the processing according to the first exemplary embodiment, so that description thereof will be omitted. In the present exemplary embodiment, step S504 is not executed because the average luminance value of the face/human body before AE is not used. Further, in the present exemplary embodiment, step S506 is not executed because the average luminance value of the divided area before AE is not used.

In step S1201, through the formula 6, the photometric area setting unit 407 calculates an average distance Dobject of the face/human body area from the distance information acquired from the monitoring camera 101.

$$\overline{D}_{object} = \frac{1}{f}\sum_{s=1}^{f}\left\{\frac{1}{k_s \times l_s}\sum_{i=-k_s/2}^{k_s/2}\sum_{j=-l_s/2}^{l_s/2} D(v_s + i, h_s + j)\right\} \quad \text{Formula 6}$$

Here, "D(x, y)" represents distance information (m) of a two-dimensional coordinate position (x, y) in a horizontal direction (x-axis direction) and a vertical direction (y-axis direction) in the image. Further, "f" represents the number of detected faces/human bodies, "(v, h)" represents central coordinates where the face or the human body is detected, "k" represents a detected object size in the horizontal direction, and "l" represents a detected object size in the vertical direction. In addition, of the detected human body portions, a human body portion corresponding to a detected face can be eliminated from the calculation in the formula 6.

Next, in step S1202, the photometric area setting unit 407 executes area division of distance information. In step S1202, the area division is executed by the number of blocks and the size that are the same as those in step S505.

In step S1203, through the formula 7, the photometric area setting unit 407 calculates an average distance Darea of each area (divided area) divided in step S1202.

$$\overline{D}_{area_r} = \frac{1}{m_r \times n_r}\sum_{i=-m_r/2}^{m_r/2}\sum_{j=-n_r/2}^{n_r/2} D(p_r + i, q_r + j) \quad \text{Formula 7}$$

Here, "D(x, y)" represents distance information (m) of a two-dimensional coordinate position (x, y) in a horizontal direction (x-axis direction) and a vertical direction (y-axis direction) in the image. Further, "(p, q)" represents central coordinates of each area, "m" represents a size of each area in the horizontal direction, and "n" represents a size of each area in the vertical direction.

Next, in step S1204, through the formula 8, the photometric area setting unit 407 calculates a difference value ΔDr between the average distance Dobject of the face/human body area calculated in step S1201 and the average distance Darea of each area calculated in step S1203.

$$\Delta \overline{D}_r = |\overline{D}_{object} - \overline{D}_{area_r}| \quad \text{Formula 8}$$

In step S1205, through the formula 9, the photometric area setting unit 407 calculates a difference value ΔIr between the average luminance value Iobject of the face/human body after AE calculated in step S510 and the average luminance value Iarea of each area after AE calculated in step S511.

$$\Delta \overline{I}_r = |\overline{I}_{object} - \overline{I}_{area_r}| \quad \text{Formula 9}$$

Lastly, in steps S1206 and S1207, the photometric area is selected through the formula 10 based on the difference value ΔIr of the average luminance values and the difference value ΔIDr of the average distances.

In other words, in step S1206, the photometric area setting unit 407 weights the difference value ΔIr of the average luminance values calculated in step S1205 with the difference value ΔIDr of the average distances calculated in step S1204. In the present exemplary embodiment, a weight of the difference value ΔDr of the average distances is adjusted by using a parameter a. For example, a large value is set as the parameter a when an area that is influenced by environmental light in the same way as in the face/human body area is preferentially selected. In other words, the weighted difference value is calculated through a formula "ΔIr+ΔDr×α".

In step S1207, the photometric area setting unit 407 extracts an area r where the smallest value is calculated as the weighted value (ΔIr+ΔDr×α) obtained in step S1206 through the formula 10, and sets the extracted area r to the monitoring camera 101 as the photometric area, and the processing ends.

$$r_{min} = \text{argmin}(\Delta \overline{I}_r + \Delta \overline{D}_r \times \alpha) \quad \text{Formula 10}$$

As described above, according to the present exemplary embodiment, an area that is at a close distance from the area where the face or the human body is detected is preferentially selected as the photometric area. It is assumed that an influence of ambient environmental light (e.g., outside light or interior light) becomes more similar when a distance between the areas is shorter. By executing the processing according to the present exemplary embodiment, AE is executed in an area that is influenced by ambient environmental light in a same way as the area where the face/human body is detected, so that accuracy thereof can be prevented from being lowered even in a case where the environmental light is changed.

In the present exemplary embodiment, the processing in steps S1201 to S1207 is executed based on distance information of a depth direction (e.g., a direction vertical to a sheet plane in FIGS. 7A and 7B) acquired from the image plane phase difference sensor (image sensor 902). However, the present exemplary embodiment is not limited thereto. When the monitoring camera 101 uses a sensor (image sensor) that cannot acquire distance information of the depth direction, the processing according to the present exemplary embodiment can be employed by calculating a distance in a lateral direction based on a field of view and a pixel position of the image. Further, the processing according to the present exemplary embodiment can be employed by calculating a distance in an oblique direction from distance information of both of the depth direction and the lateral direction.

Furthermore, accuracy can be further improved by combining the processing according to the present exemplary embodiment and the processing according to the first exemplary embodiment. In this case, in step S515 of the first exemplary embodiment, the difference value ΔIr is weighted with the average distance difference value ΔDr in the same way as the processing in steps S1206 and S1207 of the present exemplary embodiment.

Hereinafter, a third exemplary embodiment of the present invention will be described with reference to FIGS. 1 to 4 and FIGS. 13 to 15. In the first exemplary embodiment, the client apparatus 103 automatically sets (determines) a photometric area used when exposure control is executed by the monitoring camera 101 through the processing in FIG. 6. In the present exemplary embodiment, a photometric area that is used when exposure control is executed by the monitoring camera 101 is determined by the user. In addition, the same reference numerals are applied to the configuration and the processing similar to those described in the first exemplary embodiment, and detailed description thereof will be omitted.

Figure 13:
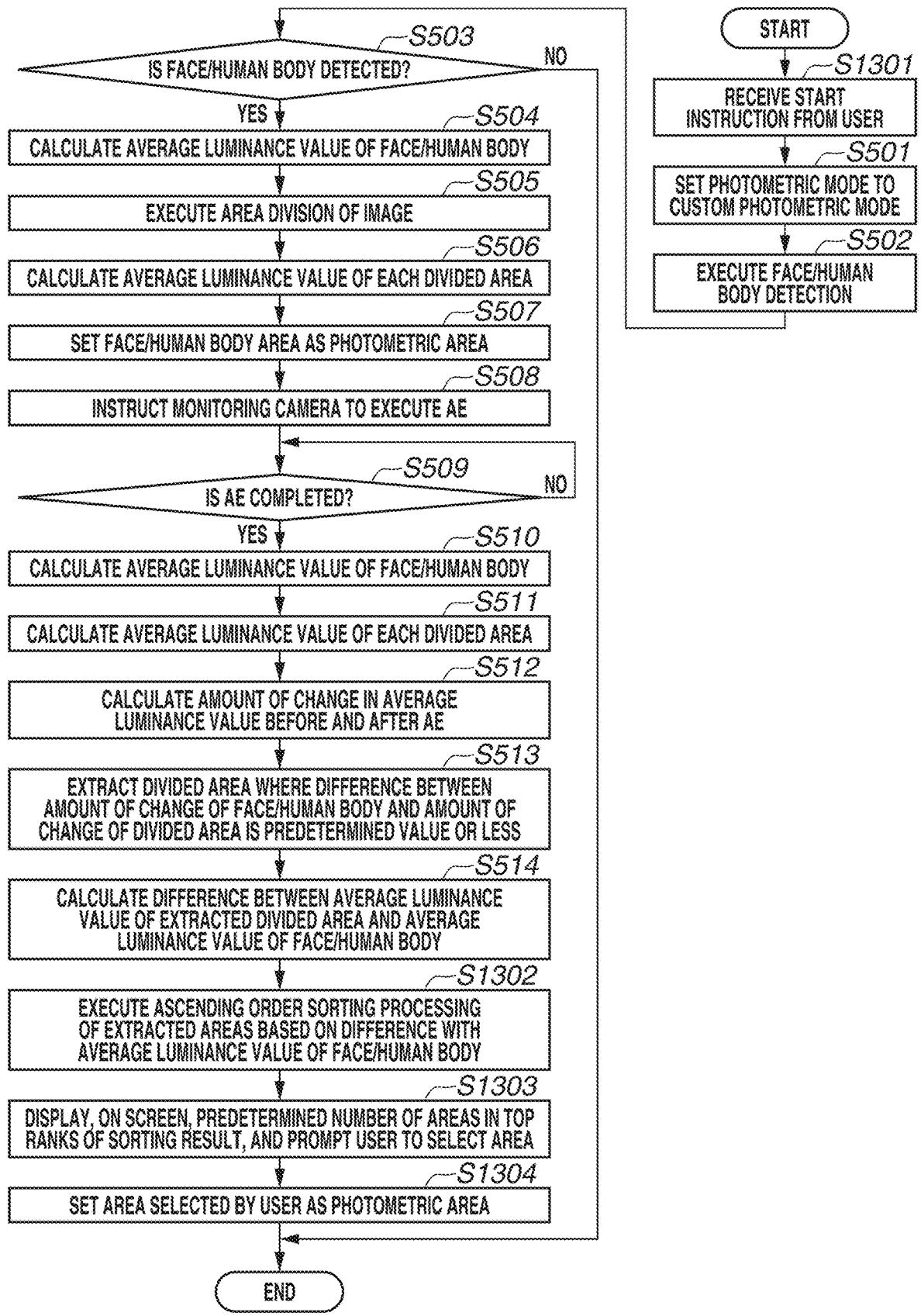
FIG. 13 is a flowchart illustrating photometric area setting processing according to a third exemplary embodiment.

The photometric area selection processing according to the present exemplary embodiment will be described with reference to the flowchart in FIG. 13. When the flowchart in FIG. 13 is compared with the flowchart in FIG. 6 described in the first exemplary embodiment, it is found that, in the present exemplary embodiment (FIG. 13), step S1301 is executed before step S501, steps S501 to S514 are subsequently executed, and steps S1303 to S1304 are executed after step S514. Step S515 executed in the first exemplary embodiment is not executed in the present exemplary embodiment. The processing in steps S501 to S514 is similar to the processing described in the first exemplary embodiment, so that description thereof will be omitted.

Figure 14:
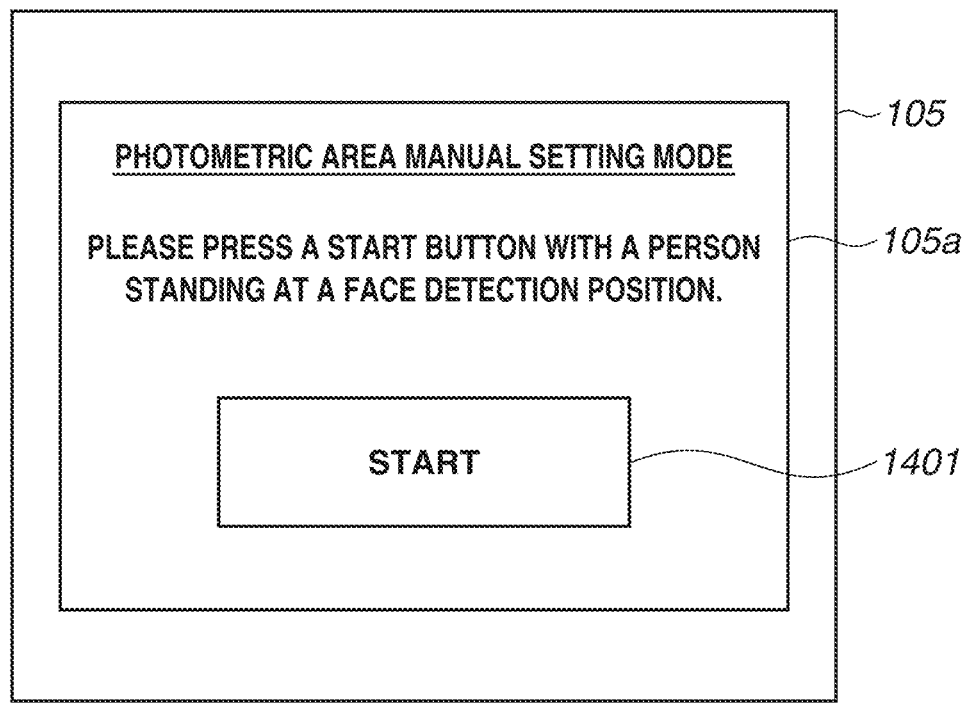
FIG. 14 is a diagram illustrating a user interface (UI) manually operable by a user.

When the user operates the input device 104 to input an instruction for manually setting the photometric mode of the monitoring camera 101 to the client apparatus 103, in step S1301, the photometric area setting unit 407 displays a graphical user interface (GUI) 105a illustrated in FIG. 14 on the display device 105. Through the GUI 105a, the display device 105 prompts the user to start the photometric area setting processing. The processing proceeds to step S501 when a start button 1401 is pressed. Then, the processing in steps S501 to S514 is executed. After the processing in step S514, the processing proceeds to step S1302.

In step S1302, based on the difference value calculated in step S514, the photometric area setting unit 407 executes ascending order sorting processing to sort the areas extracted in step S513 in the order of an area having a smallest difference value.

In step S1303, the photometric area setting unit 407 superimposes and displays a predetermined number of areas in the top ranks from among the areas sorted in step S1302 on an input image (i.e., an image captured by the monitoring camera 101) as area candidates on the display device 105, and prompts the user to select the area. FIG. 15 is a diagram illustrating a screen (selection screen) displayed on the display device 105 when the predetermined number is set to 3 (i.e., when three areas are provided as the area candidates). A message prompting the user to make a selection is displayed on the screen of the display device 105. An area 1501 is a area candidate ranked in first place, an area 1502 is an area ranked in second place, and an area 1503 is an area ranked in third place. In the present exemplary embodiment, numerals "1", "2", and "3" which represent ranking order of the candidates are displayed inside the areas 1501 to 1503. The user can intuitively select the area by looking at the numerals. In other words, when there are two or more area candidates (divided areas), the two or more area candidates are displayed in different modes, so that the user can easily select the area.

The user uses the input device 104 to select any one of the areas 1501 to 1503. For example, the area can be selected by clicking the mouse of the input device 104, operating a cursor key of the keyboard, or touching the touch panel. For example, the user selects the area 1501.

Lastly, the photometric area setting unit 407 sets the area selected in step S1303 to the monitoring camera 101 as the photometric area and the processing ends.

As described above, according to the present exemplary embodiment, the user can interactively sets the photometric area. In the present exemplary embodiment, a predetermined number of area candidates are superimposed and displayed on the input image, so that the user is allowed to select one area therefrom. With this configuration, the user can intuitively select an area less likely to be changed from among the area candidates. By setting the above-described area as the photometric area, AE can be executed more stably, so that lowering of face/human body detection performance can be suppressed.

Although the user selects the area 1501 in the above-described exemplary embodiment, the user may select another area candidate. For example, in a case where a cardboard box is placed in the area 1501 instead of the fire extinguisher, there is a possibility that the cardboard box is removed from the area 1501. If the cardboard box is removed from the area 1501, the luminance of the area 1501 will be changed. Therefore, the user may think that selecting the area 1501 as the photometric area is not appropriate. In this case, the user can select the area 1502.

Further, although three area candidates are displayed on the display device 105, one or more area candidates may be displayed thereon.

Although the present exemplary embodiment has been described by making a comparison with the first exemplary embodiment, the manual setting described in the present exemplary embodiment can also be employed in the second exemplary embodiment. In this case, for example, a divided area where a value of $\Delta Ir+\Delta Dr \times \alpha$ acquired in step S1206 is a predetermined value or less is displayed on the display device 105 as an area candidate. Then, the photometric area setting unit 407 displays the area candidate on the display device 105 to prompt the user to make a selection without executing step S1207. In a case where more than one area candidate exist, a display mode is changed for each of the area candidates.

Although the monitoring camera 101 is described in the above-described exemplary embodiments, an imaging apparatus other than the monitoring camera 101 may be used. Further, although the monitoring camera 101 and the client apparatus 103 are described as separate apparatuses, the client apparatus 103 and the monitoring camera 101 may be integrated. In this case, an image capturing apparatus integrally configured of the client apparatus 103 and the monitoring camera 101 executes the photometric area setting processing illustrated in FIG. 6, 12, or 13.

Other Exemplary Embodiments

The present invention can be realized through processing in which a program for realizing one or more functions according to the above-described exemplary embodiments is supplied to a system or an apparatus via a network or a storage medium, so that one or more processors included in a computer of the system or the apparatus read and execute the program. Further, the present invention can also be realized with a circuit (e.g., application specific integrated circuit (ASIC)) that realizes one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-010098, filed Jan. 24, 2020, which is hereby incorporated by reference herein in its entirety.

What is claimed is:
1. A control apparatus comprising:
    a detection unit configured to detect an object area in an image captured by an image capturing apparatus;
    a dividing unit configured to divide the image into a plurality of divided areas;
    a first calculation unit configured to calculate a luminance difference as a difference between a luminance value of the object area and a luminance value of each of the divided areas;
    a second calculation unit configured to calculate a first amount of change as a difference between luminance values of the object area before and after the image capturing apparatus executes exposure control by setting the object area as a photometric area and a second amount of change as a difference between luminance values of the divided area before and after the image capturing apparatus executes exposure control by setting the object area as a photometric area; and
    a determination unit configured to determine a photometric area which is used when the image capturing apparatus executes exposure control based on the first amount of change, the second amount of change, and the luminance difference.

2. The control apparatus according to claim 1, wherein, from among the plurality of divided areas, the determination unit determines the photometric area based on a difference between a luminance value of a divided area where a difference between the first amount of change and the second amount of change is a predetermined value or less and a luminance value of the object area.

3. The control apparatus according to claim 2, wherein, when the determination unit determines the photometric area, the luminance difference is weighted with a difference between the first amount of change and the second amount of change.

4. The control apparatus according to claim 2, wherein, when the determination unit determines the photometric area, the luminance difference is weighted with a difference between a distance from the image capturing apparatus to the object area and a distance from the image capturing apparatus to the divided area.

5. The control apparatus according to claim 1, wherein, in a case where the number of divided areas where a difference between the first amount of change and the second amount of change is a predetermined value or less is two or more, the determination unit determines as the photometric area a divided area where the difference between the first amount of change and the second amount of change is the predetermined value or less, where a difference between a luminance value of the divided area and a luminance value of the object area is the smallest value, from among the two or more divided areas.

6. The control apparatus according to claim 1, further comprising a display unit configured to display a divided area where a difference between the first amount of change and the second amount of change is a predetermined value or less.

7. The control apparatus according to claim 6, wherein, in a case where the number of divided areas where the difference between the first amount of change and the second amount of change is the predetermined value or less is two or more, the display unit changes a display mode of each of the two or more divided areas based on a difference between a luminance value of each of the divided areas where the difference between the first amount of change and the second amount of change is the predetermined value or less and a luminance value of the object area.

8. The control apparatus according to claim 1, wherein the detection unit detects at least a human face or a human body as the object area.

9. The control apparatus according to claim 1, wherein, with respect to the exposure control, a photometric area can be set at an optional position in the image.

10. An imaging control system comprising:
an image capturing unit configured to capture an image; and
the control apparatus according to claim 1, configured to determine a photometric area of the image capturing unit based on the image captured by the image capturing unit.

11. A control method comprising:
detecting an object area in an image captured by an image capturing apparatus;
dividing the image into a plurality of divided areas;
calculating a luminance difference as a difference between a luminance value of the object area and a luminance value of each of the divided areas;
calculating a first amount of change as a difference between luminance values of the object area before and after the image capturing apparatus executes exposure control by setting the object area as a photometric area and a second amount of change as a difference between luminance values of the divided area before and after the image capturing apparatus executes exposure control by setting the object area as a photometric area; and
determining a photometric area which is used when the image capturing apparatus executes exposure control based on the first amount of change, the second amount of change, and the luminance difference.

12. The control method according to claim 11, wherein the photometric area is determined from among the plurality of divided areas, based on a difference between a luminance value of a divided area where a difference between the first amount of change and the second amount of change is a predetermined value or less and a luminance value of the object area.

13. The control method according to claim 12, when the photometric area is determined, the luminance difference is weighted with a difference between the first amount of change and the second amount of change.

14. The control method according to claim 12, wherein, when the photometric area is determined, the luminance difference is weighted with a difference between a distance from the image capturing apparatus to the object area and a distance from the image capturing apparatus to the divided area.

15. A non-transitory computer-readable medium storing a program for causing a computer to execute the method according to claim 11.

* * * * *